United States Patent [19]

Buschle et al.

[11] Patent Number: 5,232,290
[45] Date of Patent: Aug. 3, 1993

[54] ROLLER BEARING HELD TOGETHER BY A BONDING COMPOSITION BEFORE INSTALLATION

[75] Inventors: Werner Buschle, Muhlheim; Rudolf Kühl, Michelau; Klaus Muschiol, Schweinfurt; Harry Reimann, Fridingen, all of Fed. Rep. of Germany

[73] Assignee: SKF GmbH, Schweinfurt, Fed. Rep. of Germany

[21] Appl. No.: 956,108

[22] Filed: Oct. 2, 1992

[30] Foreign Application Priority Data

Oct. 4, 1991 [DE] Fed. Rep. of Germany ....... 4132928

[51] Int. Cl.$^5$ .................... F16C 41/04; F16C 43/04
[52] U.S. Cl. ..................... 384/448; 384/584; 384/620
[58] Field of Search ............... 384/448, 463, 490, 510, 384/537, 559, 584, 617, 620, 621; 29/898.061, 898.062

[56] References Cited

U.S. PATENT DOCUMENTS

| | | | |
|---|---|---|---|
| 1,907,015 | 5/1933 | Swart | 29/898.062 |
| 1,982,932 | 12/1934 | Scribner | 384/584 X |
| 3,857,148 | 12/1974 | Hata | 29/898.062 |
| 3,985,209 | 10/1976 | Glasson | 384/448 |
| 4,225,200 | 9/1980 | Dougall | 384/621 |
| 4,492,415 | 1/1985 | Baile et al. | 384/463 |
| 4,580,913 | 4/1986 | Dreschmann et al. | 384/448 |

*Primary Examiner*—Thomas R. Hannon
*Attorney, Agent, or Firm*—Eugene E. Renz, Jr.

[57] ABSTRACT

A roller bearing assembly, comprising two bearing rings having confronting raceways and rolling element in the annular space between the rings and a cage for the rolling elements. The components of the bearing are held together as a unit before installation by a bonding composition which melts at elevated operating temperatures. Each bearing ring has at least two recesses distributed on the circumference extending from surfaces facing away from the raceways of the bearing rings into the space between the bearing rings and ring segments of the wax-grease-adhesive bonding composition are provided preferably over portion of the circumference between the bearing rings, encompassing components of the bearing.

5 Claims, 1 Drawing Sheet

ROLLER BEARING HELD TOGETHER BY A BONDING COMPOSITION BEFORE INSTALLATION

FIELD OF THE INVENTION

The present invention relates generally to roller bearings and more specifically to an axial needle bearing comprising two bearing rings or disks, and a plurality of rolling elements in the space between the rings supported in circumferentially spaced array by means of a cage. The bearing components are held together as a unit before installation by a bonding medium which melts at elevated operating temperatures.

BACKGROUND OF THE INVENTION

U.S. Pat. No. 1,982,932 shows roller bearings of the general type to which the present invention relates. In this known prior roller bearing, the assembled bearing is dipped in a bath of paraffin or wax so that the bearing parts are held together after the paraffin or wax has dried. It has been found that this method for securing bearings for transportation or installation has certain disadvantages and drawbacks. For example, it has been found that the thin coating breaks even under relatively small impact loads and the bearing components fall apart.

SUMMARY OF THE INVENTION

With the foregoing in mind, it is an object of the present invention to provide a roller bearing characterized by novel features of construction arrangement wherein the bearing components are held together securely during transportation and before installation. To this end, in accordance with the present invention, each bearing ring or disk is provided with at least two recesses distributed about its periphery which extend from an outer surface facing away from the raceways of the roller bearing rings or disks and open into the space between the roller bearing rings or disks and through which an adhesive or bonding mixture is injected into the annular space where it spreads circumferentially and radially to form ring shaped segments. These ring shaped segments enclose or encapsulate parts of the bearing and include a locking pin portion formed in the recesses.

A roller bearing constructed in this way achieves the goal of holding the bearing components together securely before installation even if they are subjected to relatively strong impacts, for example during transportation. The bonding composition or mixture used to secure the bearing for transport or installation is destroyed only at the time the bearing is put into service. The wax-grease-adhesive bonding composition is designed to melt at high operating temperatures and mixes with the bearing lubricant without any deleterious or negative side effects on the bearing.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
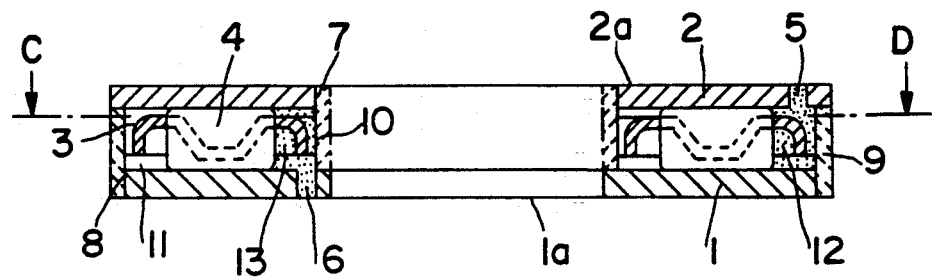
FIG. 1 is a transverse sectional view taken on lines A-B of FIG. 2 of an axial needle bearing assembly made in accordance with the present invention.

Referring now to the drawings and particularly to FIG. 1 thereof, the axial needle roller bearing assembly comprises a pair of ring-like disks 1 and 2, consisting of a wave washer 1 and a housing disk 2, and a plurality of needle rollers 4 disposed between the disks 1,2 and oriented in circumferentially spaced relation by means of a cage 3. In the present instance, housing disk 2 has at least two diametrically opposed axially extending recesses 5 located adjacent to its outer edge. Wave washer 1 is provided with at least two diametrically opposed axially oriented recesses 6 on its inner edge which are staggered and off-set 90° with respect to the recesses 5 in the housing disk 2. As illustrated, the recesses 5 and 6 extend from axial end surfaces 1a and 2a of bearing disks 1 and 2, respectively, and open into the bearing space 11 between the bearing disks 1 and 2.

Figure 2:
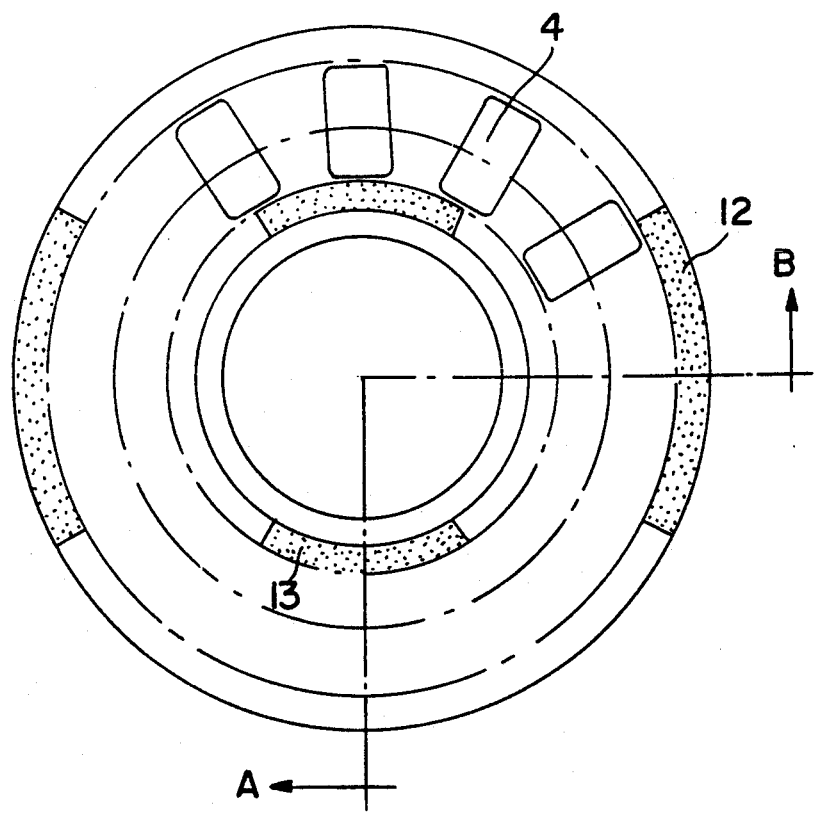
FIG. 2 is a sectional view taken on lines C-D of FIG. 1.

During assembly of the bearing, mounting sleeve 9 is pushed onto the circumferentially extending lateral surface 8 of the bearing disk 1 to form an outside enclosure for the bearing space 11, and mounting sleeve 10 is inserted into bore 7 of the bearing disks 1,2 in the position shown in FIG. 1 to provide an inner enclosure for the bearing space 11. The wax-grease-adhesive bonding mixture is then injected through recessed 5 and 6 so that it penetrates into the open spaces between the rolling elements 4 and cage 3 over a portion of the periphery to form ring-shaped segments 12 and 13. As best illustrated in FIG. 2, the segments 12 are staggered circumferentially relative to the diametrically opposed segments 13. After the bonding mixture has solidified, the mounting sleeves 9,10 are removed and the various parts of the bearing are now held together by the ring-shaped segments 12 and 13 which have locking fingers engaging in recesses 5 and 6, respectively, permitting a compact bearing unit to be installed without difficulty. During operation of the bearing, the joints between the bearing parts 1 and 2 and ring-shaped segments 12 and 13 are broken. For example, at a predetermined operating temperature, the bonding mixture melts and mixes harmlessly with the lubricant. The bonding composition or mixture is a combination of known ingredients including a high-molecular paraffin wax, a grease and an adhesive which hardens or dries at ambient temperatures to form the ring-like segments holding the bearing parts together and melts at approximately 70°-80° C. in the range of the operating temperature of the bearing.

Even though a particular embodiment of the invention has been illustrated and described herein, it is not intended to limit the invention, and changes and modifications may be made therein within the scope of the following claims. For example, the bonding system or adhesive joint system described above is not only useful for axial needle bearings, but also has application in other bearings, such as cylindrical roller bearings, and axial ball bearings. The joint system is also applicable to radial bearings wherein the parts are capable of falling apart before installation. Examples of such radial bearings are angular contact ball bearings and conical roller bearings. Furthermore, bearing disk 2 can be removed first and then the bonding mixture added and when the disk 2 is replaced, the bonding mixture will penetrate into the recess 5.

SUMMARY

Roller Bearing, Particularly an Axial Needle Bearing

In a roller bearing, especially an axial needle bearing, consisting of two bearing rings or disks (1,2) and rolling elements (4) held in a cage (3) between them, the bearing components (1, 2, 3, 4) are held together to form a unit before installation by means of a bonding medium which melts at elevated operating temperatures.

So that the bearing components are held together securely before installation, each bearing ring or disk (1,2) has at least two recesses (5,6) distributed on the periphery, which start from the surfaces (1a, 2a) of the bearing rings or disks facing away from the raceways of the bearing rings or disks (1,2) and open out into the space (11) between the bearing rings or disks (1,2). Ring-shaped segments (12,13) consisting of a wax-grease-adhesive bonding mixture are provided preferably over a portion of the periphery between the bearing rings or disks, these segments enclosing parts (3) of the bearing and engaging in the recesses (5,6).

What is claimed is:

1. A roller bearing assembly, having components including two bearing rings having confronting raceways, and rolling elements in the annular space between the rings and a cage for the rolling elements, the components of the bearing being held together as a unit before installation by a bonding composition which melts at elevated operating temperatures, characterized in that each bearing ring (1,2) has at least two recesses (5,6) distributed on the circumference extending from surfaces (1a, 2a) facing away from the raceways of the bearing rings (1,2) into the space (11) between the bearing rings (1,2), and ring segments (12,13) formed of the bonding composition extending over a portion of the circumference between the bearing rings (1,2), encompassing components of the bearing and engaging in the recesses (5,6).

2. A roller bearing according to claim 1, characterized in that one of the bearing rings (2) is provided with two diametrically opposing recesses (5) on the outer edge, and the other bearing ring (1) is provided with two diametrically opposing recesses (6) on the inner edge.

3. A roller bearing according to claim 2, characterized in that the recesses (5) in said one bearing ring (2) are offset 90° with respect to the recesses (6) in said other bearing ring (1).

4. A roller bearing according to claim 1, characterized in that, when the bearing is assembled, mounting sleeves (9,10) are provided, which seal off the space (11) between the bearing rings (1,2).

5. A roller bearing according to claim 1 wherein the bonding composition is a mixture of a high molecular paraffin wax, a grease and an adhesive which hardens or dries to a solid state at ambient temperatures to hold the components together and melts at bearing operating temperatures in the range of 70°-80° C.

* * * * *